W. W. REYNOLDS.
SCALE-BEAM.
No. 174,154.   Patented Feb. 29, 1876.
Fig. 1.
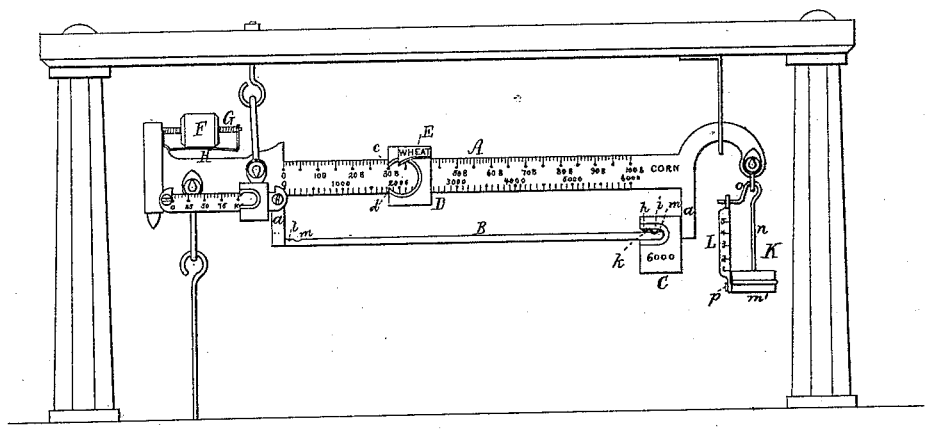
Fig. 2.   Fig. 4.   Fig. 6.
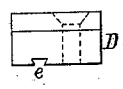      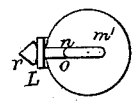
Fig. 3.   Fig. 5.   Fig. 7.
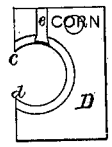      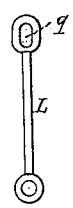
Witnesses.   Wm. W. Reynolds
             by his attorney

UNITED STATES PATENT OFFICE.

WILLIAM W. REYNOLDS, OF BRANDON, VERMONT, ASSIGNOR TO BRANDON MANUFACTURING COMPANY, OF SAME PLACE.

IMPROVEMENT IN SCALE-BEAMS.

Specification forming part of Letters Patent No. 174,154, dated February 29, 1876; application filed May 22, 1875.

*To all whom it may concern:*

Be it known that I, WILLIAM W. REYNOLDS, of Brandon, of the county of Rutland and State of Vermont, have invented a new and useful Improvement in Apparatus for Weighing, and do hereby declare the same to be fully described in the following specification, and represented in the accompanying drawings, of which—

Figure 1 denotes a side view of a scale-beam provided with my invention. Fig. 2 is a top view, and Fig. 3 a front view of the movable poise without the auxiliary poise. Fig. 4 is a top view, and Fig. 5 a rear view of the auxiliary poise. Fig. 6 is a top view of the counterpoise. Fig. 7 is an edge view of the scale of said counterpoise.

My invention relates to means of preventing accidental turning of the adjustable balance-weight on its supporting-screw; also to means of preventing wear of the wedge-point of the slide-weight of the bar of the beam.

In such drawings, A denotes a scale-beam or steelyard provided with a bar, B, and a slide-weight, C, to move thereon, the said bar being supported by arms $a$ $a$, extending down from the beam as shown.

The beam is to be graduated for the weighing of grain, as corn for instance, the upper scale of graduations being to indicate bushels or measures, and the lower pounds or weights, in the kind of grain to be weighed at any time.

The movable poise D, to slide on the beam, has two indices, $c$ $d$, for such scales, one for the upper and one for the lower of them. Furthermore, it is provided with a vertical tapering groove, $e$, which is dovetailed in transverse section, and is to receive a correspondingly-shaped tongue, $f$, projecting from an auxiliary poise, E, formed as shown. The tongue and the groove are widest at their upper ends, and the groove is open at its lower end.

The main poise alone is for weighing corn, but with the auxiliary poise added to the main poise wheat may be weighed. Thus, there may be for weighing with the main poise different kinds of grain, such as oats, rye, and barley for instance, a series of auxiliary poises, each being marked with the name of the grain for which it may be required, the main poise being marked with the name of the grain, as corn, (maize,) that can be weighed by it without the auxiliary poise.

In order that the setting wedge-point $h$ of the slide-weight C may not become worn by the upper edge of the support-bar while the weight is being moved along the bar, I provide such weight with a projection lug or rider, $i$, to extend from it as shown, and furthermore I make in the bar near each of its notches $k$ $l$, to receive the wedge-point, an auxiliary notch, $m$, to receive the rider. The rider should project from the weight farther than the wedge-point, in order that while the weight may be in the act of being moved along the bar, the rider, by resting on the edge of the bar, shall keep the wedge-point out of contact therewith.

Instead of a rider stationary relatively to the weight, a wheel may be used to revolve freely.

In order to prevent the adjustable balance-weight F from accidentally revolving on its screw G, I provide the scale-beam with a bow-spring, H, arranged as shown, to bear against the outer surface of the cylindrical weight. Such, while permitting the weight to be revolved by a person, will keep it stationary under other circumstances.

The counterpoise shown at K (and consisting of a disk, $m'$, and a stem, $n$, having at its upper end a hook, $o$) I provide with a graduated bar or weight-scale, L, separate from the stem and fixed to the periphery of the disk by a screw, $p$. The upper end of the graduated bar L has a slot, $q$, through it, to enable it, when raised horizontally, to be slipped over a triangular head, $r$, at the end of the hook, such head, slot, and screw serving to hold the graduated bar to the counterpoise, which, when the bar is disconnected from it, can be hooked to or unhooked from the beam. The graduated bar L overcomes difficulties incident to the graduations when made directly on the stem, and furthermore it serves to keep the counterpoise from becoming accidentally detached from the beam.

What I claim as my invention is as follows:

1. In combination with the scale-beam A, and its adjustable cylindrical balance-weight F, and its supporting screw G, the retaining-spring H, fixed to the beam so as to bear against the outer surface of the weight.

2. The slide-weight C, provided with the wedge-point $h$ and rider $i$, in combination with the support-bar furnished with the notches $k$ $l$ $m$ $m$ for reception of the rider and the wedge-point $h$, as explained.

WM. W. REYNOLDS.

Witnesses:
R. H. EDDY,
J. R. SNOW.